(12) United States Patent
Kusuda et al.

(10) Patent No.: US 7,773,131 B2
(45) Date of Patent: Aug. 10, 2010

(54) SOLID STATE IMAGE SENSING DEVICE WITH LEVEL FLUCTUATION SUPPRESSION

(75) Inventors: Masayuki Kusuda, Akashi (JP); Tomokazu Kakumoto, Yokohama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1099 days.

(21) Appl. No.: 11/438,585

(22) Filed: May 22, 2006

(65) Prior Publication Data

US 2006/0268371 A1 Nov. 30, 2006

(30) Foreign Application Priority Data

May 24, 2005 (JP) ............................. 2005-150338
Apr. 7, 2006 (JP) ............................. 2006-106268

(51) Int. Cl.
*H04N 5/217* (2006.01)
(52) U.S. Cl. ..................... 348/241; 348/308
(58) Field of Classification Search ............... 348/234, 348/241, 294, 302, 308
See application file for complete search history.

(56) References Cited

U.S. PATENT DOCUMENTS

| | | | |
|---|---|---|---|
| 5,267,028 A * | 11/1993 | Suga et al. ............... | 348/223.1 |
| 6,633,342 B2 * | 10/2003 | Kim ............................. | 348/606 |
| 6,836,291 B1 | 12/2004 | Nakamura et al. ........... | 348/301 |
| 6,927,884 B2 | 8/2005 | Takada et al. ............... | 358/513 |
| 6,956,606 B2 | 10/2005 | Mabuchi ...................... | 348/308 |
| 2002/0167613 A1 * | 11/2002 | Niko ............................ | 348/622 |
| 2005/0083421 A1 * | 4/2005 | Berezin et al. ............... | 348/308 |
| 2005/0151867 A1 * | 7/2005 | Goto et al. ................... | 348/302 |
| 2006/0001061 A1 * | 1/2006 | Miyatake et al. ............. | 257/292 |
| 2007/0046797 A1 * | 3/2007 | Kakumoto .................... | 348/294 |
| 2008/0018766 A1 * | 1/2008 | Miyatake ..................... | 348/308 |
| 2008/0284890 A1 * | 11/2008 | Miyatake ..................... | 348/308 |

FOREIGN PATENT DOCUMENTS

JP 2002-300476 A 10/2002

* cited by examiner

*Primary Examiner*—Gevell Selby
(74) *Attorney, Agent, or Firm*—Sidley Austin LLP

(57) ABSTRACT

A level shifter (181) shifts a signal level of a noise signal produced from a pixel so that the signal level becomes close to a reference level, and then a level shifter (182) complements the noise signal whose level was shifted by the level shifter (181) by a signal level corresponding to the level shifted by the level shifter (181). After that, the differential amplifier (183) performs subtraction operation between the noise signal that has passed the level shifters (181, 182) and the image signal from the pixel, so as to output the image signal without noises.

22 Claims, 9 Drawing Sheets

VERTICAL SYNCHRONIZING SIGNAL

HORIZONTAL SYNCHRONIZING SIGNAL

NOISE SIGNAL

IMAGE SIGNAL

SOLID STATE IMAGE SENSING DEVICE WITH LEVEL FLUCTUATION SUPPRESSION

This application is based on Japanese Patent Application No. 2005-150338 filed on May 24, 2005 and Japanese Patent Application No. 2006-106268 filed on Apr. 7, 2006, the contents of which are hereby incorporated by reference.

BACKGROUND OF THE INVENTION

1. Field of the Invention

The present invention relates to a solid state image sensing device including pixels that produce electric signals corresponding to incident light. In particular, the present invention relates to a solid state image sensing device including pixels that are made up of transistors.

2. Description of Related Art

Solid state image sensing devices that are used for various applications can be classified under two groups, which are a CCD type and a CMOS type, in accordance with a difference of means for reading (extracting) photocharge generated in photoelectric conversion elements. The CCD type stores photocharge in potential wells and transfers the photocharge using the same, so a dynamic range of this type is narrow, which is a disadvantage thereof. On the other hand, the CMOS type reads photocharge stored in a pn junction capacitance of a photodiode through a MOS transistor directly.

In addition, one of conventional CMOS type solid state image sensing devices performs a logarithmic transformation operation in which quantity of incident light is processed by logarithmic transformation (see JP-A-11-313257). This solid state image sensing device has a wide dynamic range of 5-6 digits. Therefore, even if a subject of image sensing has a luminance distribution of a little wide luminance range, the image sensing device can convert entire luminance information within the luminance distribution into an electric signal to be produced. However, since an image sensible range is wider than the luminance distribution of a subject, there may be generated an area without luminance data at a low luminance area or a high luminance area within the image sensible range.

The applicant has disclosed a CMOS type solid state image sensing device that can switch between the above-mentioned logarithmic transformation operation and a linear transformation operation (see JP-A-2002-77733). In addition, for the purpose of performing the switch operation automatically between the linear transformation operation and the logarithmic transformation operation, the applicant has disclosed a CMOS type solid state image sensing device that sets a potential state of a transistor connected to a photodiode for performing a photoelectric conversion operation to an appropriate state (see JP-A-2002-300476). This solid state image sensing device disclosed in the JP-A-2002-300476 changes a potential state of a transistor so as to switch a point of inflection in which the photoelectric conversion operation is switched from the linear transformation operation to the logarithmic transformation operation.

In addition, there is disclosed another conventional solid state image sensing device that includes a pixel having a floating node as shown in FIG. 8 (see JP-A-2002-051263). This solid state image sensing device includes a photodiode PD that works as a photosensitive element, a MOS transistor T1 having a source connected to an anode of the photodiode PD, a MOS transistor T2 having a source connected to a drain of the MOS transistor T1, a MOS transistor T3 having a gate connected to a connection node between a drain of the MOS transistor T1 and a source of the MOS transistor T2, and a MOS transistor T4 having a drain connected to a source of the MOS transistor T3.

A dc voltage VPS is applied to a cathode of the photodiode PD and back gates of the MOS transistors T1-T4, and dc voltages VRS and VPD are applied to drains of the MOS transistors T2 and T3, respectively. In addition, signals φTX, φRS and φV are supplied to gates of the MOS transistors T1, T2 and T4, respectively, and a source of the MOS transistor T4 is connected to an output signal line 14. The MOS transistors T1-T4 are N-channel MOS transistors.

As shown in FIG. 10, when light enters the photodiode PD, photocharge is generated so that potential of the photodiode PD is decreased in accordance with the generated photocharge (the upper the position is, the lower the potential is in FIG. 10). In this case, a potential generated in the photodiode PD becomes a value that is proportional to an integral value of the quantity of incident light in a linear manner. Then, a voltage due to the potential of the photodiode PD is transferred via a transfer gate TG to an N type floating diffusion layer FD, and an electric signal of the transferred voltage is output as the image signal.

This solid state image sensing device outputs a noise signal and an image signal after reset in series when the signals φV, φRS and φTX are given at timings as shown in FIG. 11A. More specifically, the signal φRS is set to the high level so that the N type floating diffusion layer FD is reset to a potential of the dc voltage VRS. Then, the signal φRS is set to the low level, and a pulse signal φV that becomes the high level is given, so that the noise signal corresponding to a reset voltage is output. Then, the signal φTX is set to the high level, and the photocharge stored in the embedded photodiode PD is transferred to the N type floating diffusion layer FD. After that, the signal φTX is set to the low level, and the pulse signal φV that becomes the high level is given, so that the image signal corresponding to incident light is output.

The image signal and the noise signal obtained as described above are given to a subtracting circuit, which subtracts the image signal from the noise signal so that an image signal without a noise is obtained. However, if a subject of image sensing has a high luminance, charge that is overflowed from the photodiode PD during a time period t1 from the time of resetting the signal φRS to the low level to the time of setting the signal φV to the high level may flow in the N type floating diffusion layer FD. As a result, a potential of the N type floating diffusion layer FD is decreased. Therefore, a voltage of the noise signal becomes higher than a voltage of the image signal normally, but a voltage of the noise signal becomes lower than a voltage of the image signal, so the image signal obtained from a differential amplifier is decreased. Thus, reversed pixels may be generated in the high luminance area.

On the contrary, there is another device that prevents the overflow of photocharge from the photodiode PD by maintaining the signal φRS at the high level during the period until giving the pulse signal φV for output of the noise signal as the timing shown in FIG. 11B. However, even if this timing is used for driving, quantity of photocharge that flows in from the photodiode PD becomes larger than resetting the N type floating diffusion layer FD by the dc voltage VRS that becomes the reset voltage when a subject of image sensing has a very high luminance. Thus, a potential of the N type floating diffusion layer FD is decreased. As a result, reversed pixels may be generated in the very high luminance area.

A state of the signal when the reversed pixels are generated is shown in FIG. 12. In accordance with a horizontal synchronizing signal, a noise signal and an image signal of each row is output. A voltage of the noise signal is lowered in the reversed pixel, and a voltage level thereof varies substantially. In such a pixel that outputs a noise signal with a voltage level varying substantially, a noise signal becomes larger than an image signal. Therefore, an image signal of the reversed pixel is output from the differential amplifier. This problem of reversed pixels may be conspicuous particularly in a solid state image sensing device that performs the logarithmic transformation operation described above because there is increased chance of image sensing of a subject having a very high luminance area.

SUMMARY OF THE INVENTION

An object of the present invention is to provide a solid state image sensing device including a filter that passes a noise signal produced from the pixel so as to suppress a fluctuation of a noise signal level for preventing reversed pixels from being generated.

A solid state image sensing device according to the present invention includes a pixel having a photoelectric conversion element that generates photocharge corresponding to quantity of incident light and stores the same inside, and a correction circuit for producing an image signal without a noise component by performing subtraction operation between a noise signal produced by the pixel when the pixel is initialized and the image signal corresponding to the quantity of incident light. The correction circuit includes an analog filter for suppressing a fluctuation component of the noise signal from the pixel that is generated when a subject of image sensing has a high luminance, and a subtracter for performing a subtraction operation between the noise signal from the analog filter and the image signal from the pixel.

According to the present invention, since the correction circuit is provided with an analog filter, it is possible to suppress a level fluctuation that may be generated in a noise signal when a subject of image sensing has a high luminance. Therefore, it is possible to prevent a noise signal from increasing and an image signal after correction from becoming a value that is close to a black level when a subject of image sensing has a high luminance. Thus, generation of reversed pixels can be suppressed. In addition, since the analog filter is made up of two shift registers, downsizing of the solid state image sensing device is not interfered.

DESCRIPTION OF THE PREFERRED EMBODIMENTS

Hereinafter, an embodiment of the present invention will be described with reference to the attached drawings.

<Structure of Image Sensing Device>

Figure 1:
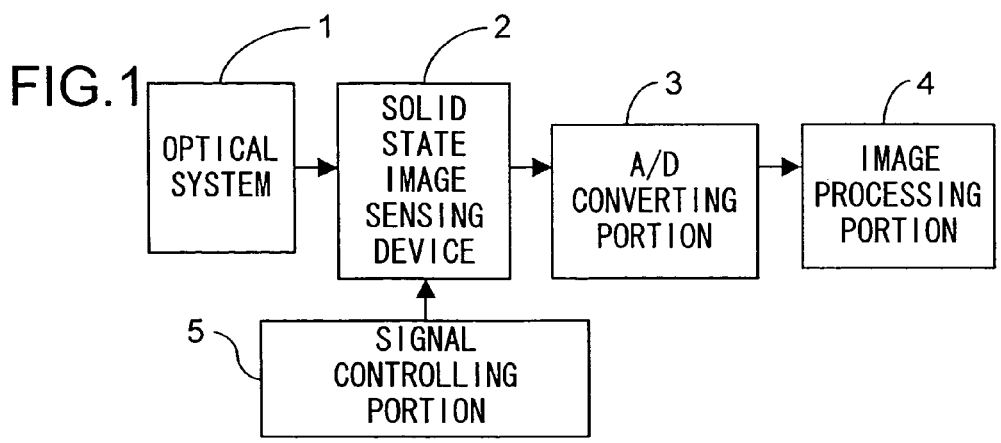
FIG. 1 is a block diagram showing a structure of an image sensing device according to an embodiment of the present invention.

As shown in FIG. 1, an image sensing device according to the present embodiment includes an optical system 1 made up of a plurality of lenses, a solid state image sensing device 2 that converts quantity of incident light that enters through the optical system 1 into an electric signal so as to output an image signal, an A/D converting portion 3 that converts the image signal produced by the solid state image sensing device 2 into a digital signal, an image processing portion 4 that performs various image processes on the image signal converted into the digital signal by the A/D converting portion 3, and a signal controlling portion 5 that controls voltage values of signals in the solid state image sensing device 2.

In the image sensing device having the above-mentioned structure, light from a subject enters the solid state image sensing device 2 through the optical system 1, and the solid state image sensing device 2 performs an image sensing operation. Then, the image signal produced by the solid state image sensing device 2 is given to the A/D converting portion 3, which converts the image signal to a digital signal. In this operation, the solid state image sensing device 2 is supplied with signals from the signal controlling portion 5, so that a horizontal scanning circuit and a vertical scanning circuit work in the solid state image sensing device 2. Thus, the image signals of pixels are given to the A/D converting portion 3 in series. The A/D converting portion 3 converts the image signal into the digital signal, which is given to the image processing portion 4 for performing image processes such as an edge enhancement process and a white balance process.

<Structure of Solid State Image Sensing Device>

Figure 2:
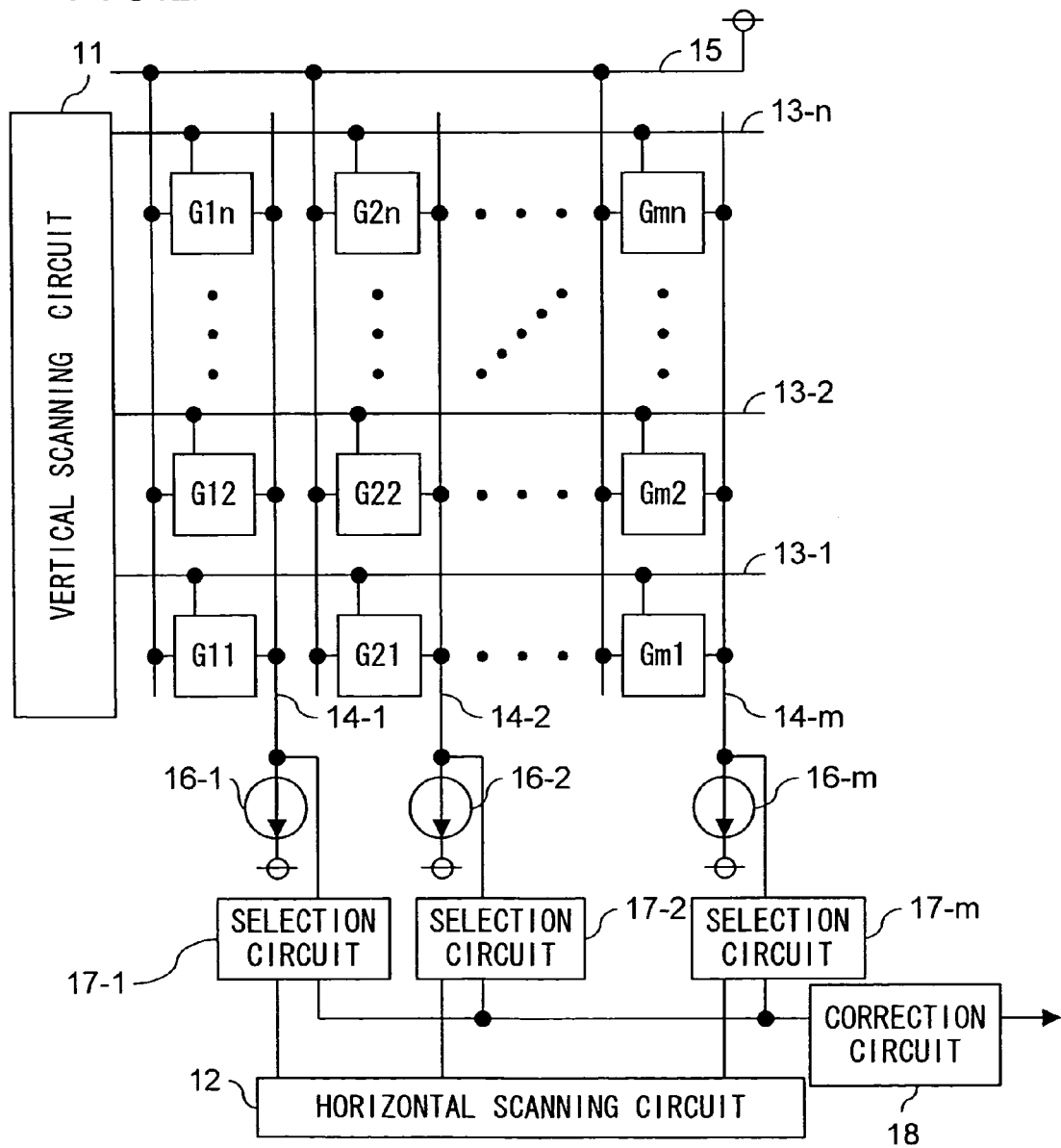
FIG. 2 is a block diagram showing a structure of a solid state image sensing device that is provided to the image sensing device shown in FIG. 1.

First off, the solid state image sensing device according to the present embodiment will be described with reference to FIG. 2. FIG. 2 shows schematically a structure of a part of a two-dimensional MOS type solid state image sensing device according to the embodiment of the present invention.

In FIG. 2, reference signs G11-Gmn represent pixels arranged in rows and columns (in a matrix). Reference numeral 11 denotes the vertical scanning circuit, which scans rows (lines) 13-1, 13-2, ..., 13-n so as to apply the signal φV to pixels in series. Reference numeral 12 is the horizontal scanning circuit, which reads a photoelectric conversion signal of each pixel that are transferred from the pixel to output signal lines 14-1, 14-2, ..., 14-m in the horizontal direction in series. Reference numeral 15 is a power source line. Not only the above-mentioned lines 13-1 through 13-n, the output signal lines 14-1 through 14-m and the power source line 15 but also other lines (for example, a clock line, a bias supplying line and the like) are connected to each pixel, but they are not shown in FIG. 2.

In addition, the output signal lines 14-1 through 14-*m* are connected to constant current sources 16-1 through 16-*m*, respectively. Furthermore, there are provided selection circuits 17-1 through 17-*m* that sample and hold the image signals and the noise signals given by the pixels G11 through Gmn via the output signal lines 14-1 through 14-*m*, respectively. When the image signal and the noise signal are sent out in series from the selection circuits 17-1 through 17-*m* to the correction circuit 18, the correction circuit 18 performs a correction process so that an image signal after removing noises is output externally. In addition, the dc voltage VPS is applied to an end of each of the constant current sources 16-1 through 16-*m*.

In this solid state image sensing device 2, the image signal and the noise signal that become output signals from a pixel Gab (the reference sign "a" denotes a natural number that satisfies the inequality $1 \leq a \leq m$, and the reference sign b denotes a natural number that satisfies the inequality $1 \leq b \leq n$) are output via the output signal line 14-*a*, respectively, and they are amplified by the constant current source 16-*a* that is connected to the output signal line 14-*a*. Then, the image signal and the noise signal that are produced in the pixel Gab are sent out to the selection circuit 17-*a* in series, and the selection circuit 17-*a* samples and holds the image signal and the noise signal.

After that, the selection circuit 17-*a* outputs the sampled and held image signal to the correction circuit 18, and then the sampled and held noise signal is sent out to the correction circuit 18. The correction circuit 18 performs a correction process on the image signal supplied from the selection circuit 17-*a* in synchronization with the noise signal supplied from the same selection circuit 17-*a*, so as to output externally the image signal after removing noises. Note that an example of a structure of the selection circuits 17-1 through 17-*m* and correction circuit 18 is disclosed in JP-A-2001-223948 by the applicant. In addition, it is possible to provide a correction circuit to positions of the selection circuits 17-1 through 17-*m*.

In addition, with respect to this solid state image sensing device 2, the signal controlling portion 5 gives a signal to the vertical scanning circuit 11, so that the vertical scanning circuit 11 outputs a signal for setting a timing for closing the transfer gate of pixels on each row and a signal for setting a timing for the pixels G11 through Gmn to start image sensing and a timing for producing the image signal and the noise signal. In addition, the signal controlling portion 5 gives a signal to the horizontal scanning circuit 12, so that the horizontal scanning circuit 12 outputs a signal for setting a timing for the selection circuits 17-1 through 17-*m* to output the image signal and the noise signal to the correction circuit 18.

<Structure and Operation of Pixels>

Figure 8:
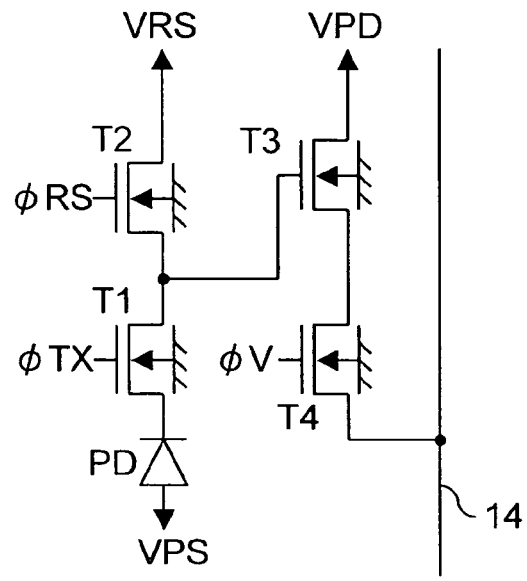
FIG. 8 is a circuit diagram showing a structure of a pixel that is provided to the solid state image sensing device.
Figure 9:
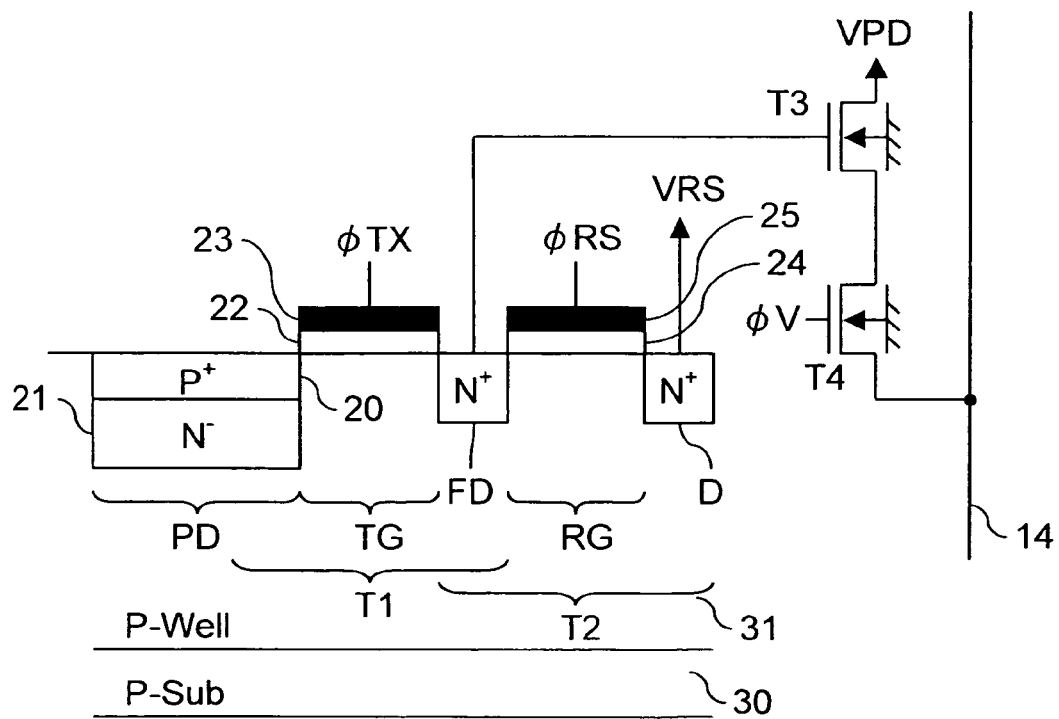
FIG. 9 shows a schematic structure of the pixel shown in FIG. 8.
Figure 10:
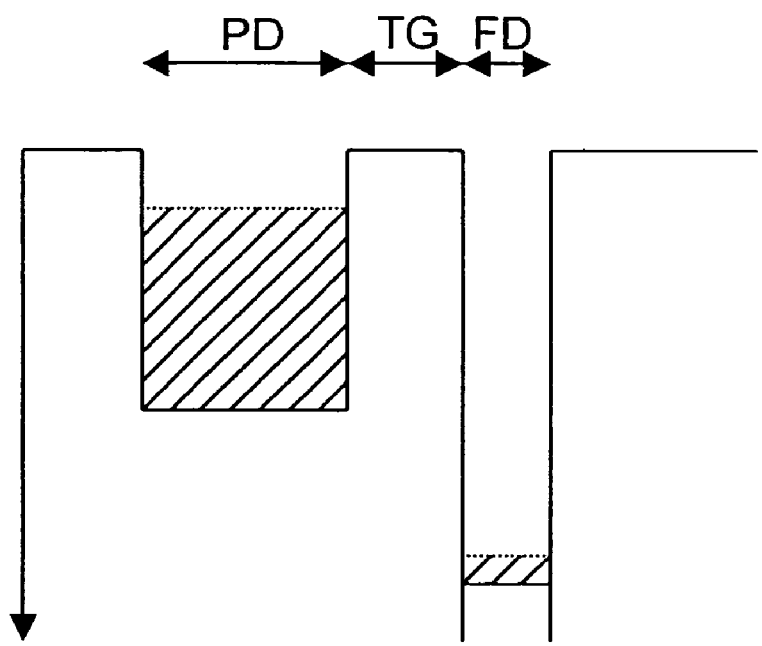
FIG. 10 shows a potential state of each channel of the pixel shown in FIG. 8.
Figure 11A:
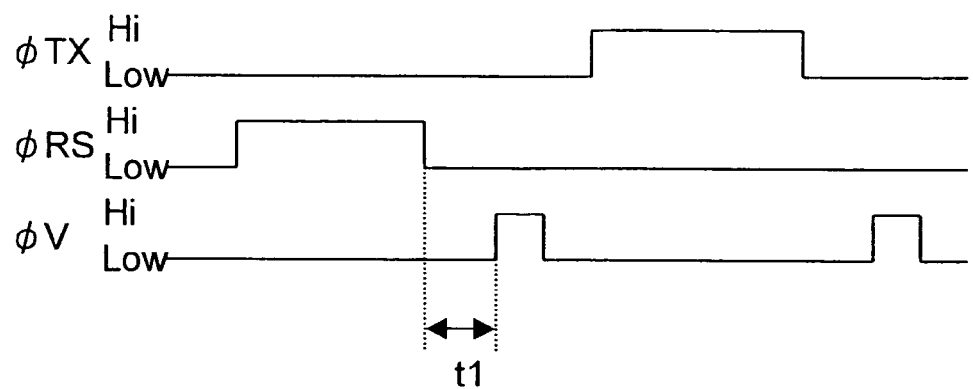
FIGS. 11A and 11B are timing charts showing states of signals for explaining an example of an operation of the pixel shown in FIG. 8.
Figure 11B:
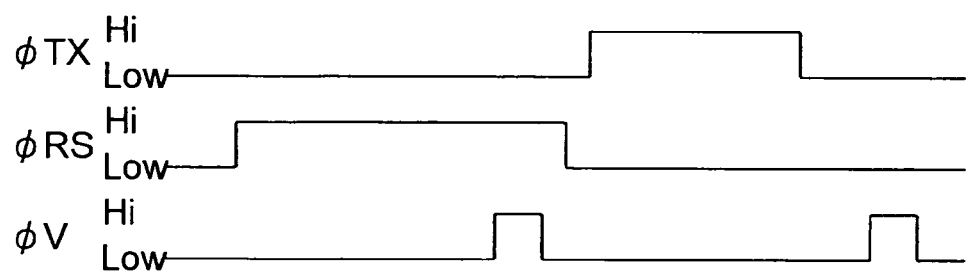
Figure 12:
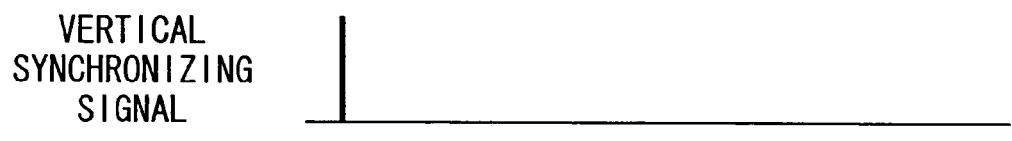
FIG. 12 shows output signals of a conventional solid state image sensing device when reversed pixels are generated.
Figure 12:
Figure 12:

Structure of the pixels that are disposed in the solid state image sensing device having the structure shown in FIG. 2 is similar to the structure described in "BACKGROUND OF THE INVENTION" with reference to FIG. 8. More specifically, as shown in FIG. 9, the structure includes an embedded photodiode PD made up of a P type well layer 31 formed on a P type substrate 30, a concentrated P type layer 20 formed on the P type well layer 31 and an N type embedded layer 21; a MOS transistor T1 made up of a transfer gate TG having a gate electrode 23 that is formed on a surface of an area adjacent to the area where the embedded photodiode PD is formed via an insulating layer 22, an N type embedded layer 21 and an N type floating diffusion layer FD; a MOS transistor T2 made up of a reset gate RG having a gate electrode 25 formed on a surface of an area adjacent to the N type floating diffusion layer FD via an insulating film 24, an N type floating diffusion layer FD and an N type diffusion layer D; a MOS transistor T3 having a gate that is connected to the N type floating diffusion layer FD; and a MOS transistor T4 having a drain that is connected to a source of the MOS transistor T3. Since the embedded photodiode PD is formed within a pixel as described above, potential on the surface of the P type layer 20 is fixed to the same potential as that of a channel stopper layer made up of a P type layer around this embedded photodiode PD.

The MOS transistors T1-T4 are N-channel MOS transistors, and the dc voltage VPS is applied to the cathode of the photodiode PD and the back gates of the MOS transistors T1-T4. Furthermore, the dc voltages VRS and VPD are applied to the drains of the MOS transistors T2 and T3, respectively. In addition, the signals φTX, φRS and φV are applied to the gates of the MOS transistors T1, T2 and T4, respectively. Furthermore, the source of the MOS transistor T4 is connected to the output signal line 14 (that corresponds to the output signal lines 14-1 through 14-*m* shown in FIG. 1).

In each pixel that constitutes the solid state image sensing device 2 according to the present embodiment, the signal φTX that is given to the transfer gate TG is the signal that changes among three voltage values VH, VM and VL (VH>VM>VL). The voltage value VM of the signal φTX is set to an appropriate value. As a result, when quantity of photocharge generated by the embedded photodiode PD becomes larger than a certain value, the MOS transistor T1 can operate in a sub threshold area. In accordance with quantity of incident light, the photoelectric conversion operation can be switched between the linear transformation operation and the logarithmic transformation operation. In addition, when the voltage value VM of the signal φTX is changed, it is possible to change the point of inflection where the photoelectric conversion operation by the embedded photodiode PD and the MOS transistor T1 is switched from the linear transformation operation to the logarithmic transformation operation. Hereinafter, an operation of the pixel in the solid state image sensing device according to the present embodiment will be described.

An operation of the pixel having this structure will be described with reference to the timing chart shown in FIG. 3. First, the signal φV is set to the low level so that the MOS transistor T4 is turned off. After that, a voltage value of the signal φTX is set to VM, and the signal φRS is set to the high level, so that the MOS transistor T2 is turned on. In this way, a potential of the transfer gate TG is set to a value lower than a potential of the embedded photodiode PD, and a potential of the N type floating diffusion layer FD is set to the same value as a potential of the dc voltage VRS through the reset gate RG. A potential that shows up at the transfer gate TG becomes an intermediate value between a potential of the embedded photodiode PD and a potential of the reset gate RG.

Figure 4A:
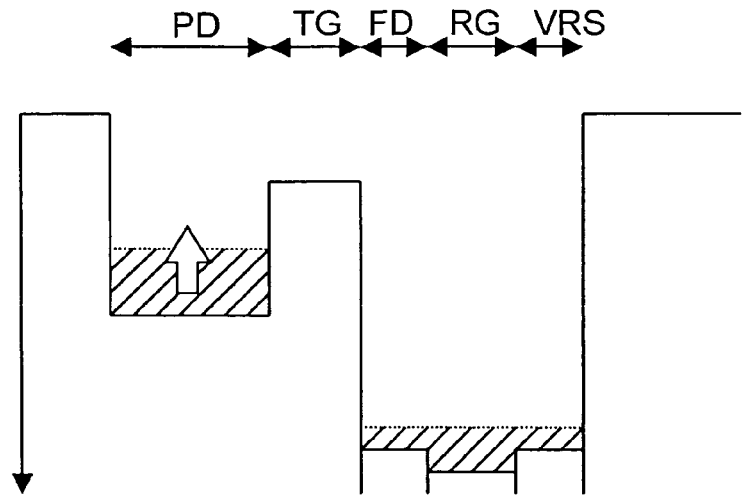
FIGS. 4A-4C show potential states of channels in a pixel within the solid state image sensing device shown in FIG. 2.
Figure 4B:
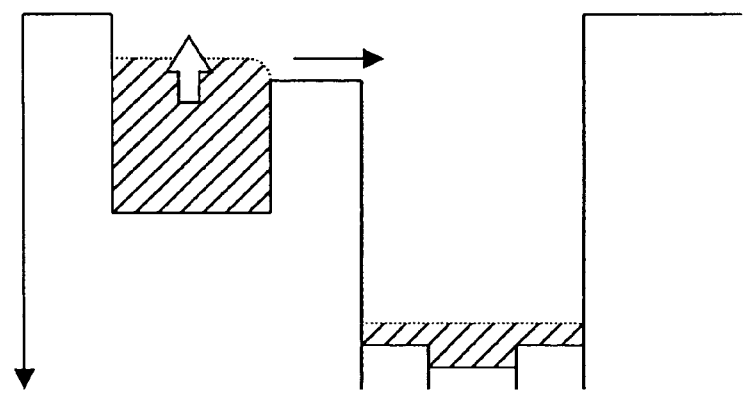

When light enters the embedded photodiode PD, photocharge is generated in accordance with quantity of the incident light, and the photocharge is stored in the embedded photodiode PD so that a potential of the embedded photodiode PD changes. If luminance of a subject is low, photocharge is stored in the embedded photodiode PD so that potential of the embedded photodiode PD changes linearly with respect to an integral value of the quantity of incident light as shown in FIG. 4A. If luminance of a subject is high, a potential of the embedded photodiode PD is lowered. When a difference between the potential of the embedded photodiode PD and a potential of the transfer gate TG becomes close to a threshold level, the MOS transistor T1 including the transfer gate TG works in the sub threshold area so that current flows as shown in FIG. 4B. Therefore, a potential that shows up in the embedded photodiode PD changes in proportion to a log value of current generated by the photoelectric conversion.

Figure 4C:
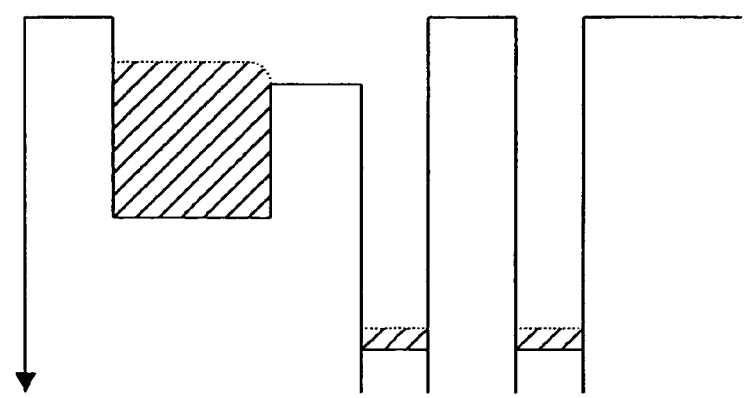

The embedded photodiode PD performs the photoelectric conversion operation in this way while the signal φRS is set to the high level so that a potential of the floating diffusion layer FD is initialized to a potential of the dc voltage VRS that is a reset voltage. Then, the signal φRS is set to the low level, and the MOS transistor T2 is turned off, so that a potential of the N type floating diffusion layer FD is set to a floating state as shown in FIG. 4C. After that, a pulse signal φV that becomes the high level is given to the gate of the MOS transistor T4, so that the MOS transistor T4 is turned on. Therefore, a voltage signal corresponding to a potential of the N type floating diffusion layer FD that was initialized is output as the noise signal to the output signal line 14.

Figure 5A:
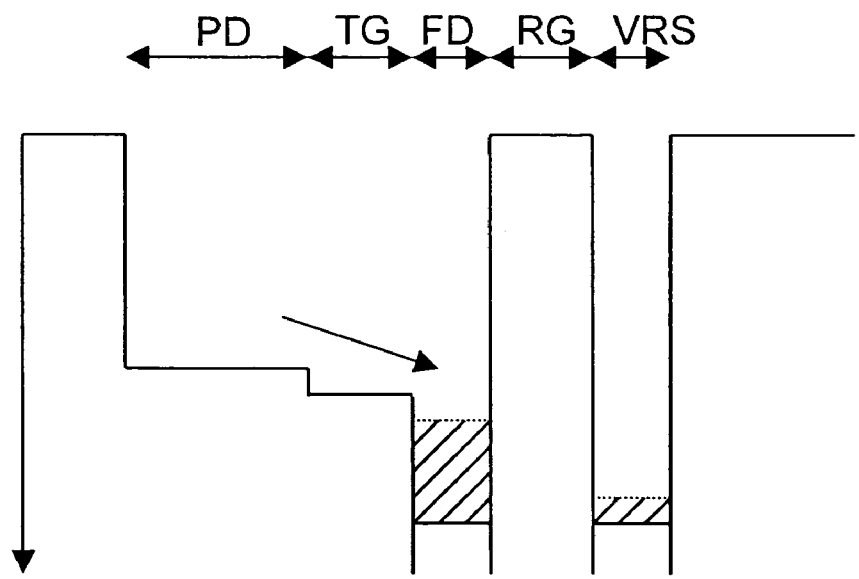
FIGS. 5A and 5B show potential states of channels in a pixel within the solid state image sensing device shown in FIG. 2.
Figure 5B:
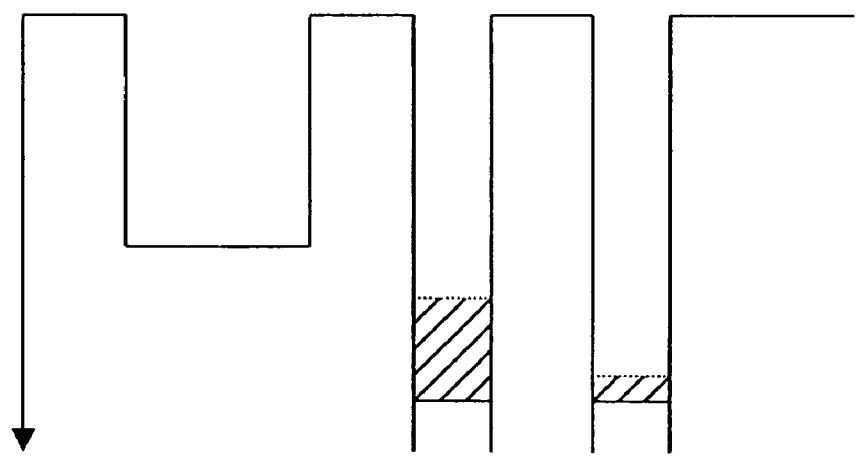

After that, a voltage value of the signal φTX is switched to VH so that a potential of the transfer gate TG is increased as shown in FIG. 5A. As a result, photocharge stored in the embedded photodiode PD is transferred to the N type floating diffusion layer FD. Therefore, a potential of the N type floating diffusion layer FD changes to a value corresponding to a potential of the embedded photodiode PD. Then, a voltage value of the signal φTX is switched to VL so that a potential of the transfer gate TG is decreased as shown in FIG. 5B. By protecting the photocharge in the embedded photodiode PD from transferring, the N type floating diffusion layer FD keeps the potential in the embedded photodiode PD. After that, the pulse signal φV that becomes the high level is given to the gate of the MOS transistor T4 so that a voltage signal corresponding to quantity of incident light is output as the image signal to output signal line 14.

The image signal is output in this way, and after that the signal φV is set to the low level. Then, a voltage value of the signal φTX is switched to VM, and after that the signal φRS is set to the high level so that the MOS transistor T2 is turned on. In this way, potential states of the embedded photodiode PD, the transfer gate TG and the N type floating diffusion layer FD become to have a relationship as shown in FIG. 4A so that the next image sensing operation is started.

In this way, the pixels G11 through Gmn in the solid state image sensing device 2 perform a sequential image sensing operation (i.e., an exposure operation) in the order of G11-Gm1, G12-Gm2, . . . , G1n-Gmn one by one row, which is a rolling shutter method. The noise signal and the image signal of pixels on each row are output, and the selection circuits 17-1 through 17-m sample and hold the noise signal and the image signal. Then, the noise signal and the image signal after the sample hold by the selection circuits 17-1 through 17-m are given to the correction circuit 18 in series one by one pixel, so that the image signal after removing noises is output. More specifically, when the noise signal and the image signal of pixels G1k-Gmk (k is a natural number that satisfies the inequality 1≦k≦n) are sampled and held in the selection circuits 17-1 through 17-m, the correction circuit 18 outputs the image signal of pixels G1k, G2k, . . . , Gmk in series.

<Structure and Operation of Correction Circuit>

Figure 6:
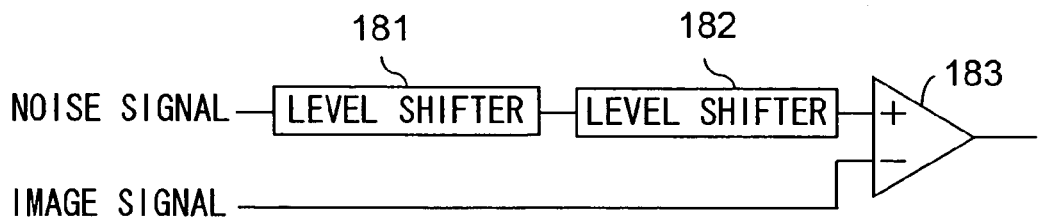
FIG. 6 is a block diagram showing a structure of a correction circuit that is provided to the solid state image sensing device shown in FIG. 2.

The correction circuit will be described with reference to the attached drawings. FIG. 6 is a block diagram showing an inner structure of the correction circuit, and FIG. 7 shows a state of the noise signal in portions inside the correction circuit.

As shown in FIG. 6, the correction circuit 18 includes a level shifter 181 that decreases a voltage value that becomes a signal level thereof with respect to the noise signal from the selection circuits 17-1 through 17-m by a voltage Vs (for example, 1.8 volts), a level shifter 182 that increases a signal level with respect to the noise signal output from the level shifter 181 by a voltage Vs (for example, 1.8 volts), and a differential amplifier 183 that is supplied with the noise signal output from the level shifter 182 at the noninverting input terminal and the image signal at the inverting input terminal.

Figure 7A:
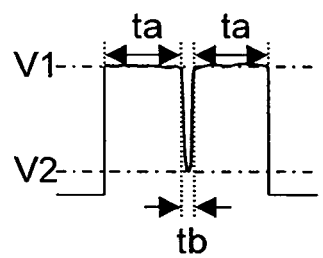
FIGS. 7A-7D show states of signals of portions inside the correction circuit shown in FIG. 6.

In addition, as shown in FIG. 7A, a signal level of the noise signal obtained from a pixel that was reset in a normal state (a signal level in a flat area ta) becomes a voltage value V1 (for example, 2.0 volts) corresponding to the dc voltage VRS that is the reset voltage. A signal level of the noise signal obtained from a pixel that was reset in a state where high luminance light entered (a signal level in a level fluctuation area tb) becomes a voltage value V2, (for example, 0.5 volts) that is lower than the voltage value V1. In this case, the voltage value V2, becomes a voltage that is higher than the voltage value V1–Vs (0<V1–Vs<V2) that is the value obtained by shifting a level of the voltage value V1 by the voltage –Vs.

Figure 7B:
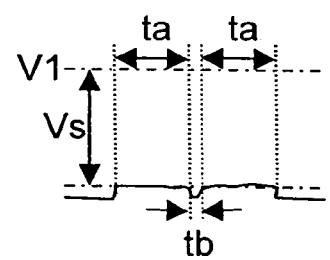

In this case, when the noise signal as shown in FIG. 7A is supplied to the level shifter 181, a signal level in the flat area ta becomes the voltage value V1–Vs, and a signal level in the level fluctuation area tb becomes the voltage value 0 as shown in FIG. 7B. Therefore, although a difference between the signal level in the flat area ta and the signal level in the level fluctuation area tb is as large as V1–V2, in the noise signal as shown in FIG. 7A when it is supplied to the level shifter 181, the difference between the signal level in the flat area ta and the signal level in the level fluctuation area tb can be as small as V1–Vs in the noise signal as shown in FIG. 7B that is shifted in level by the level shifter 181.

Figure 7C:
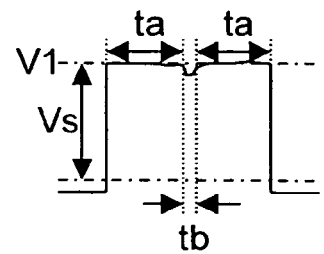

When the noise signal having a low signal level after the level shift by the voltage value Vs is given from the level shifter 181 to the level shifter 182, the signal level is increased by level shifting by the voltage value Vs so as to become the original signal level V1 of the signal level in the flat area ta as shown in FIG. 7C. In this case, as shown in FIG. 7C, the signal level in the level fluctuation area tb is shifted from the voltage value 0 to the voltage value Vs. In this way, when the noise signal passes through the level shifters 181 and 182, a signal level in the level fluctuation area tb is increased from the voltage value V2, to the voltage value Vs so that voltage fluctuation in the noise signal due to incident of high luminance light can be suppressed.

Figure 7D:

Then, the noise signal with the suppressed voltage fluctuation output from the level shifter 182 is supplied to the non-inverting input terminal of the differential amplifier 183, and the image signal varying as shown in FIG. 7D is supplied to the inverting input terminal of the differential amplifier 183. In this case, the noise signal shown in FIGS. 7A-7C and the image signal shown in FIG. 7D are analog signals of the noise signal and the image signal that are output continuously from pixels on the same row. Therefore, the level shifters 181 and 182 constitute an analog filter for reducing a component of level fluctuation due to the level fluctuation area tb. In addition, the differential amplifier 183 synchronizes an input timing of the image signal with that of the noise signal so that the image signal and the noise signal of the same pixel are input and processed.

Note that the correction circuit 18 may set the voltage Vs for level shifting by the level shifters 181 and 182 in accordance with the reset voltage VRS and the variation quantity in the threshold level of each pixel. More specifically, a voltage value V1–Vs may be larger than the variation quantity of the threshold level of each pixel, and the voltage value Vs may be set to a value that is close to the voltage value V1. Furthermore, on the contrary to the present embodiment, if a signal level of the noise signal is a value that is close to the voltage value 0 and if a signal level of the noise signal in the image sensing of a high luminance subject is a value that is close to the voltage value V2, the signal level is shifted by the level shifter 181 to increase by the voltage Vs, and then it is shifted by the level shifter 182 to decrease by the voltage Vs.

In the embodiment described above, each of the MOS transistors T1-T4 is made up of an N-channel MOS transistor. In the case where each of the MOS transistors T1-T4 is made up of an N-channel MOS transistor as described above, it is formed on a P type well layer or on a P type substrate. In addition, the MOS transistors T1 and T2 may be made up of an N-channel MOS transistor, and the MOS transistors T3 and T4 may be made up of a P-channel MOS transistor. Furthermore, it is possible that pixels of the solid state image sensing device are made up of other circuit structure rather than the structure shown in FIG. 8.

Figure 3:
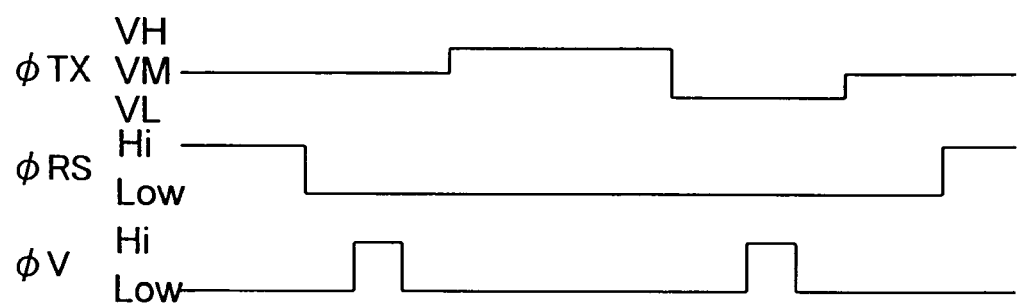
FIG. 3 is a timing chart showing states of signals for explaining an example of an operation of the solid state image sensing device shown in FIG. 2.

In addition, concerning a state of a signal that is supplied to each pixel, the rolling shutter method is adopted as shown in the timing chart of FIG. 3, in which the noise signal is output when the pulse signal φV is supplied after the signal φRS is set to the low level. However, it is possible to output the noise signal by supplying the pulse signal φV before the signal φRS is set to the low level. In addition, it is possible to output the image signal and the noise signal at a timing of a global shutter method utilizing an electronic shutter function in which transfer gates TG of all pixels are driven at the same time so that all pixels in one frame are exposed simultaneously.

Furthermore, the correction circuit 18 uses the differential amplifier 183 as a subtracter for performing subtraction operation between the image signal and the noise signal so as to remove noises, and the signal is processed in the state of an analog signal. However, it is possible to convert this analog signal into a digital signal before the subtraction operation. More specifically, the correction circuit 18 shown in FIG. 6 may be provided with a subtracter that performs a digital process instead of the differential amplifier 183, and there may be provided A/D converting portions for converting the noise signal output from the level shifter 182 into a digital signal, and an A/D converting portion for converting the image signal from the selection circuits 17-1 through 17-m into digital signals. Thus, the image signal and the noise signal that are converted into digital signals by the A/D converting portions are supplied to the subtracter, which can perform a digital process.

In addition, the subtracter, which is disposed inside the correction circuit 18 for performing a digital process, may be disposed outside the solid state image sensing device 2 at the following stage of the A/D converting portion 3. Furthermore, operations of the level shifters 181 and 182 and the differential amplifier 183 of the correction circuit 18 may be performed by a digital process.

According to the present embodiment, the level shifters 181 and 182 of the correction circuit 18 switches a signal level of the noise signal so that a signal level of the noise signal that can cause reversed pixels can be converted into a state that is close to a signal level of a normal noise signal. In order to prevent the inversion of the noise signal more securely, it is possible to use a mechanical shutter while adding a control of preventing exposure of pixels by closing the shutter during a period except for an image sensing period that includes a scan period for reading output signals of pixels and a reset period.

What is claimed is:

1. A solid state image sensing device comprising:
a pixel having a photoelectric conversion element that generates photocharge corresponding to quantity of incident light and stores the same inside; and
a correction circuit for producing an image signal without a noise component by performing subtraction operation between a noise signal produced by the pixel when the pixel is initialized and the image signal corresponding to the quantity of incident light, the correction circuit including
an analog filter for suppressing a fluctuation component of the noise signal from the pixel that is generated when a subject of image sensing has a high luminance, and
a subtracter for performing a subtraction operation between the noise signal from the analog filter and the image signal from the pixel,
wherein the analog filter is made up of a level shifter for removing a signal level that becomes the fluctuation component.

2. The solid state image sensing device according to claim 1, wherein the analog filter includes a first level shifter for shifting the signal level of the noise signal to a value that is close to a reference level and a second level shifter for complementing a value shifted by the first level shifter to the noise signal shifted by the first level shifter.

3. The solid state image sensing device according to claim 1, wherein the pixel includes
a photodiode that becomes the photoelectric conversion element and generates photocharge corresponding to quantity of incident light, which is stored inside,
a transfer gate for transferring charge stored in the photodiode,
a floating diffusion layer for storing charge transferred from the photodiode via the transfer gate,
a reset gate that is connected to the floating diffusion layer and resets the floating diffusion layer, and
a switch for reading use that is used for reading an output signal from the floating diffusion layer.

4. The solid state image sensing device according to claim 3, wherein the pixel further includes an amplifier having an input terminal connected to the floating diffusion layer and an output terminal connected to the switch for reading use.

5. The solid state image sensing device according to claim 3, wherein the photodiode is an embedded photodiode.

6. The solid state image sensing device according to claim 1, wherein the pixel performs a logarithmic transformation operation for producing the image signal that changes in a natural logarithm manner with respect to quantity of incident light to the photoelectric conversion element.

7. The solid state image sensing device according to claim 1, wherein the pixel performs a linear transformation operation for producing the image signal that changes linearly with respect to quantity of incident light to the photoelectric conversion element and a logarithmic transformation operation for producing the image signal that changes in a natural logarithm manner with respect to quantity of incident light to the photoelectric conversion element.

8. A solid state image sensing device comprising:
a pixel having a photoelectric conversion element that generates photocharge corresponding to quantity of incident light and stores the same inside; and
a correction circuit for producing an image signal without a noise component by performing subtraction operation between a noise signal produced by the pixel when the pixel is initialized and the image signal corresponding to the quantity of incident light, the correction circuit including
an analog filter for suppressing a fluctuation component of the noise signal from the pixel that is generated when a subject of image sensing has a high luminance, and a subtracter for performing a subtraction operation between the noise signal from the analog filter and the image signal from the pixel, wherein the pixel includes a photodiode that becomes the photoelectric conversion element and generates photocharge corresponding to quantity of incident light, which is stored inside, a transfer gate for transferring charge stored in the photodiode, a floating diffusion layer for storing charge transferred from the photodiode via the transfer gate, a reset gate that is connected to the floating diffusion layer and resets the floating diffusion layer, and a switch for reading use that is used for reading an output signal from the floating diffusion layer, wherein the transfer gate is controlled by a control signal that changes among three values, and wherein the control signal changes among three values including a first level for opening the transfer gate, a second level for closing the transfer gate and a third level between the first and the second levels, the noise signal is output by turning on the switch for reading use when the control signal is set to the third level, and after that, the control signal is set to the first level so that the transfer gate is opened, followed by setting the control signal to the second level when the switch for reading use is turned on so that the image signal is output.

9. A solid state image sensing device comprising:

a pixel having a photoelectric conversion element that generates photocharge corresponding to quantity of incident light and stores the same inside;

a correction circuit for producing an image signal without a noise component by performing subtraction between the noise signal produced by the pixel when the pixel is initialized and the image signal corresponding to the quantity of incident light, the correction circuit including an analog filter made up of a level shifter for removing a fluctuation component of the noise signal from the pixel generated when a subject of image sensing has a high luminance, and a subtracter for performing a subtraction operation between the noise signal from the analog filter and the image signal from the pixel; and the pixel including a photodiode that becomes the photoelectric conversion element and generates photocharge corresponding to quantity of incident light, which is stored inside, a transfer gate for transferring charge stored in the photodiode, a floating diffusion layer for storing charge transferred from the photodiode via the transfer gate, a reset gate that is connected to the floating diffusion layer and resets the floating diffusion layer, and a switch for reading use that is used for reading an output signal from the floating diffusion layer.

10. A solid state image sensing device comprising:

a pixel having a photoelectric conversion element that generates photocharge corresponding to quantity of incident light and stores the same inside; and a correction circuit for producing an image signal without a noise component by performing subtraction operation between a noise signal produced by the pixel when the pixel is initialized and the image signal corresponding to the quantity of incident light, the correction circuit including an analog filter for suppressing a fluctuation component of the noise signal from the pixel that is generated when a subject of image sensing has a high luminance, and a subtracter for performing a subtraction operation between the noise signal from the analog filter and the image signal from the pixel, wherein the pixel performs a linear transformation operation for producing the image signal that changes linearly with respect to quantity of incident light to the photoelectric conversion element, and wherein the analog filter includes a first level shifter for shifting the signal level of the noise signal to a value that is close to a reference level and a second level shifter for complementing a value shifted by the first level shifter to the noise signal shifted by the first level shifter.

11. The solid state image sensing device according to claim 1, wherein the pixel performs a linear transformation operation for producing the image signal that changes linearly with respect to quantity of incident light to the photoelectric conversion element.

12. The solid state image sensing device according to claim 8, wherein the pixel further includes an amplifier having an input terminal connected to the floating diffusion layer and an output terminal connected to the switch for reading use.

13. The solid state image sensing device according to claim 8, wherein the photodiode is an embedded photodiode.

14. The solid state image sensing device according to claim 8, wherein the pixel performs a linear transformation operation for producing the image signal that changes linearly with respect to quantity of incident light to the photoelectric conversion element.

15. The solid state image sensing device according to claim 8, wherein the pixel performs a logarithmic transformation operation for producing the image signal that changes in a natural logarithm manner with respect to quantity of incident light to the photoelectric conversion element.

16. The solid state image sensing device according to claim 8, wherein the pixel performs a linear transformation operation for producing the image signal that changes linearly with respect to quantity of incident light to the photoelectric conversion element and a logarithmic transformation operation for producing the image signal that changes in a natural logarithm manner with respect to quantity of incident light to the photoelectric conversion element.

17. The solid state image sensing device according to claim 10, wherein the pixel includes a photodiode that becomes the photoelectric conversion element and generates photocharge corresponding to quantity of incident light, which is stored inside, a transfer gate for transferring charge stored in the photodiode, a floating diffusion layer for storing charge transferred from the photodiode via the transfer gate, a reset gate that is connected to the floating diffusion layer and resets the floating diffusion layer, and a switch for reading use that is used for reading an output signal from the floating diffusion layer.

18. The solid state image sensing device according to claim 17, wherein the pixel further includes an amplifier having an input terminal connected to the floating diffusion layer and an output terminal connected to the switch for reading use.

19. The solid state image sensing device according to claim 17, wherein the photodiode is an embedded photodiode.

20. The solid state image sensing device according to claim 17, wherein the transfer gate is controlled by a control signal that changes among three values.

21. The solid state image sensing device according to claim 10, wherein the pixel performs a logarithmic transformation operation for producing the image signal that changes in a natural logarithm manner with respect to quantity of incident light to the photoelectric conversion element.

22. The solid state image sensing device according to claim 10, wherein the pixel performs a linear transformation operation for producing the image signal that changes linearly with respect to quantity of incident light to the photoelectric conversion element and a logarithmic transformation operation for producing the image signal that changes in a natural logarithm manner with respect to quantity of incident light to the photoelectric conversion element.

* * * * *